(12) United States Patent
Zu et al.

(10) Patent No.: US 11,238,420 B2
(45) Date of Patent: Feb. 1, 2022

(54) INTER-VEHICLE WIRELESS PAYMENT METHOD EMPLOYING 5G COMMUNICATION NETWORK, AND SYSTEM FOR SAME

(71) Applicant: China UnionPay Co., Ltd., Shanghai (CN)

(72) Inventors: Lijun Zu, Shanghai (CN); Nannan Li, Shanghai (CN); Yue Jin, Shanghai (CN); Ping Wang, Shanghai (CN); Shuo He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 16/759,057

(22) PCT Filed: Nov. 13, 2018

(86) PCT No.: PCT/CN2018/115215
§ 371 (c)(1),
(2) Date: Apr. 24, 2020

(87) PCT Pub. No.: WO2019/128501
PCT Pub. Date: Jul. 4, 2019

(65) Prior Publication Data
US 2020/0372477 A1   Nov. 26, 2020

(30) Foreign Application Priority Data

Dec. 29, 2017   (CN) .......................... 201711476183.4

(51) Int. Cl.
*G06Q 20/08* (2012.01)
*H04W 4/46* (2018.01)
(Continued)

(52) U.S. Cl.
CPC ....... *G06Q 20/0855* (2013.01); *G06Q 20/325* (2013.01); *G06Q 20/3829* (2013.01);
(Continued)

(58) Field of Classification Search
CPC ............. G06Q 20/0855; G06Q 20/325; G06Q 20/3829; G06Q 2220/00; G06Q 20/382;
(Continued)

(56) References Cited

U.S. PATENT DOCUMENTS

2004/0184614 A1   9/2004   Walker et al.
2013/0151412 A1   6/2013   Spahl et al.
(Continued)

FOREIGN PATENT DOCUMENTS

CN   103517245 A   1/2014
CN   104794760 A   7/2015
(Continued)

OTHER PUBLICATIONS

Int'l Search Report and Written Opinion dated Jan. 31, 2019 in Int'l Application No. PCT/CN2018/115215, translation of Search Report only.
(Continued)

*Primary Examiner* — Patrick McAtee
*Assistant Examiner* — Nakia Leffall-Allen
(74) *Attorney, Agent, or Firm* — Panitch Schwarze Belisario & Nadel LLP

(57) ABSTRACT

An inter-vehicle wireless payment method employing 5G communication network comprises a requesting vehicle sending a payment request to a base station; the base station retrieving vehicle information of a friend vehicle of the requesting vehicle based on the payment request; the base station encrypting request information with the vehicle information and broadcasting it; vehicles in coverage of the base station decoding broadcast information with respective
(Continued)

vehicle information, and upon successful decoding, the friend vehicle as a responding vehicle acquiring the request information; the responding vehicle generating payment information based on the request information and sending it to the base station, the base station sending the payment information to a payment platform, and the payment platform returning a payment result to the responding vehicle; and the base station allocating a D2D communication channel to the requesting and responding vehicles, and the responding and requesting vehicles communicating via the D2D communication channel.

18 Claims, 4 Drawing Sheets

(51) Int. Cl.
  *H04W 4/70* (2018.01)
  *G06Q 20/32* (2012.01)
  *G06Q 20/38* (2012.01)
(52) U.S. Cl.
  CPC ............... *H04W 4/46* (2018.02); *H04W 4/70* (2018.02); *G06Q 2220/00* (2013.01)
(58) Field of Classification Search
  CPC ...... G06Q 20/14; G06Q 20/308; G06Q 40/00; H04W 4/46; H04W 4/70; H04W 76/14; H04W 12/033; H04W 12/08; H04W 4/02; H04W 24/02; H04W 4/006; H04W 4/206; H04B 1/707; H04L 67/327; H04L 43/0876; H04L 41/0873; G06F 17/60
  See application file for complete search history.

(56) References Cited

U.S. PATENT DOCUMENTS

| | | | |
|---|---|---|---|
| 2016/0328714 | A1 | 11/2016 | Lee et al. |
| 2017/0140349 | A1 | 5/2017 | Ricci |
| 2017/0185367 | A1 | 6/2017 | Vegesna et al. |

FOREIGN PATENT DOCUMENTS

| | | | |
|---|---|---|---|
| CN | 104899933 | A | 9/2015 |
| CN | 105913503 | A | 8/2016 |
| CN | 108307349 | A | 7/2018 |
| EP | 3244677 | A1 | 11/2017 |
| JP | 2006004266 | A | 1/2006 |
| WO | 2011063607 | A1 | 6/2011 |
| WO | 2017026518 | A1 | 2/2017 |
| WO | 2017135428 | A1 | 8/2017 |
| WO | 2017185367 | A1 | 11/2017 |

OTHER PUBLICATIONS

Office Action dated Jul. 21, 2020 in Canadian Application No. 3,082,230.
Office Action dated Jun. 21, 2021 in Indian Application No. 202027031090.
Extended European Search Report dated Jun. 21, 2021 in European Application No. 18894597.6.
Office Action dated Apr. 23, 2021 in Japanese Application No. 2020-526955.
Office Action dated Aug. 30, 2021 in Japanese Application No. 2020-526955.
Office Action dated May 3, 2021 in Singapore Application No. 112020046045.
Office Action dated Feb. 25, 2020 in Chinese Application No. 201711476183.4.

INTER-VEHICLE WIRELESS PAYMENT METHOD EMPLOYING 5G COMMUNICATION NETWORK, AND SYSTEM FOR SAME

CROSS-REFERENCE TO RELATED APPLICATION

This application is a Section 371 of International Application No. PCT/CN2018/115215, filed Nov. 13, 2018, which was published in the Chinese language on Jul. 4, 2019 under International Publication No. WO 2019/128501 A1, which claims priority under 35 U.S.C. § 119(b) to Chinese Patent Application No. 201711476183.4, filed Dec. 29, 2017, the disclosures of which are incorporated herein by reference.

FIELD

The present disclosure relates to communication technologies, and in particular, to an inter-vehicle wireless payment method based on a 5G communication network and a system for the same.

BACKGROUND

At present, Electronic Toll Collection (ETC) technology is widely used in highway scenarios, and it has been an on-board charging system largely promoted in Europe, America, Japan and China, wherein communication between an on-board electronic tag and a microwave antenna over an ETC-dedicated lane is realized via microwave-specific short-range communication technologies, and bank background settlement is achieved via Internet technologies.

An ETC charging system consists of a plurality of subsystems, including: an Automatic Vehicle Identification (AVI) system, an Automatic Vehicle Classification (AVC) system, a Video Enforcement System (VES) and other peripheral systems.

The Automatic Vehicle Classification (AVC) system determines the type of a passing vehicle via various sensor devices mounted in and around a lane and check it with the vehicle type data stored on an on-board unit (OBU). The Video Enforcement System (VES) is employed to take the image of the license plate of a vehicle having no valid on-board unit installed and rushing through the ETC lane, for determining a toll-evading vehicle owner and notifying the vehicle owner of the fee payable. For a high-speed ETC lane, the Video Enforcement System is indispensable. For a low-speed ETC lane, an automatic high-speed rail is often employed to force an illegal vehicle to stop.

The Automatic Vehicle Identification (AVI) system uses a microwave antenna mounted on a portal or on the roadside to inquire the identification information stored on the on-board unit, for example, information such as ID number of the on-board unit, vehicle type and vehicle owner, etc., to identify whether the vehicle is allowed to pass through the ETC lane. The AVI system is the fundamental system forming an ETC lane, and it often consists of an On-Board Unit (OBU), a RoadSide Unit (RSU), an on-board unit programmer and other devices.

The main problem of the current ETC payment lies in that an additional device needs to be mounted on a vehicle and there exists only a few application scenarios, mostly for highway toll station. For a user, a dedicated bank card needs to be applied for; and for a toll station, a dedicated communication device needs to be erected. More importantly, for the ETC technology, only the payment scenario of vehicles towards roadside devices has been considered, while the inter-vehicle payment scenario has not been considered or technically designed.

SUMMARY

Therefore, it is an object of the present disclosure to provide an inter-vehicle wireless payment method based on a 5G communication network and a system for the same, thereby realizing vehicle-to-vehicle communication via 5G.

The main technical conception of the disclosure lies in that: a vehicle triggers an inter-vehicle payment scenario, initiates a payment request to a base station, wherein the payment request information includes a vehicle identification number (VIN) of the requesting vehicle and a requested amount; the base station informs a mobile edge computing (MEC) of the received payment request information, and the MEC retrieves the data stored in the MEC according to the VIN, wherein the target data may be the driver information of the vehicle corresponding to the VIN and the VIN of a friend vehicle thereof, and the MEC takes the VIN of the friend vehicle as a key to encrypt information including VIN of requesting vehicle, driver information of requesting vehicle and requested payment amount, etc.; the base station broadcasts the encrypted information processed by the MEC and searches for a responding vehicle; at least one vehicle within the coverage of the base station attempts to decrypt the information received by means of respective VIN, and if the information is decrypted successfully, it will be pushed, otherwise, it will be ignored; if the friend vehicle having decrypted successfully decides to pay, it becomes the responding vehicle and sends a grant information to the base station; the base station allocates a D2D frequency band to the requesting vehicle and the responding vehicle to enable the two vehicles to establish D2D communication, and the base station sends payment information of the responding vehicle to a payment platform such that the payment platform performs data processing; after the responding vehicle receives a payment complete message, it informs the requesting vehicle via D2D communication, and the requesting vehicle appoints the repayment matters with the responding vehicle.

An inter-vehicle wireless payment method based on a 5G communication network according to the disclosure includes:

a request sending step, in which a requesting vehicle sends a payment request to a base station;

a request-based retrieving step, in which the base station retrieves vehicle information of a friend vehicle of the requesting vehicle based on the payment request;

an encrypting step, in which the base station encrypts payment request information using the vehicle information of the friend vehicle;

a broadcasting step, in which the base station broadcasts the encrypted payment request information;

a decrypting and receiving step, in which at least one vehicle within a broadcast coverage of the base station attempts to decrypt the broadcasted payment request information using the respective vehicle information, and if one of the at least one vehicle decrypts the broadcasted payment request information successfully, the one of the at least one vehicle, that is the friend vehicle, acts as a responding vehicle and acquires the payment request information;

a payment implementation step, in which the responding vehicle generates payment information based on the payment request information and sends the payment information to the base station, the base station sends the payment information to a payment platform, and the payment platform returns a payment result to the responding vehicle; and a D2D communication step, in which the base station allocates a D2D communication channel to the requesting vehicle and the responding vehicle, and the responding vehicle and the requesting vehicle communicate with each other via the D2D communication channel.

Preferably, in the request-based retrieving step, the base station retrieves driver information of the requesting vehicle and a vehicle identification number (VIN) of the friend vehicle thereof according to a VIN of the requesting vehicle contained in the payment request by means of mobile edge computing; and in the encrypting and broadcasting step, the base station encrypts the payment request information using the VIN of the friend vehicle and broadcasts the encrypted payment request information.

Preferably, communicating, by the responding vehicle and the requesting vehicle, with each other via the D2D communication channel includes: notifying, by the responding vehicle, the requesting vehicle of the payment result; and communicating at least one repayment agreement information between the requesting vehicle and the responding vehicle.

Preferably, the D2D communication step includes substeps of: detecting, by the base station, that the requesting vehicle and the responding vehicle are in the same cell or in adjacent cells, and determining whether a D2D connection between the requesting vehicle and the responding vehicle is possible according to a strategy with a maximum number of allowed D2D connections; and, if it is determined that the D2D connection is possible, allocating, by the base station, resources for the D2D connection and establishing a link for the D2D connection; otherwise, entering a waiting state. Accordingly, the base station allocates the D2D communication channel to the requesting vehicle and the responding vehicle, and the responding vehicle and the requesting vehicle communicate with each other via the D2D communication channel.

An inter-vehicle wireless payment method based on a 5G communication network according to the disclosure includes:
- a frequency band applying step, in which requesting vehicle applies a D2D communication frequency band from a base station;
- a resource allocating step, in which the base station performs resource allocation according to a strategy with a maximum number of allowed D2D connections;
- an encrypting and broadcasting step, in which the requesting vehicle broadcasts encrypted payment request information using the D2D communication frequency band allocated in the resource allocating step, wherein the payment request information is encrypted using vehicle information of a friend vehicle;
- a decrypting and receiving step, in which at least one vehicle attempts to decrypt the broadcasted payment request information using its respective vehicle information, and if one of the at least one vehicle decrypts the broadcasted payment request information successfully, the one of the at least one vehicle, that is the friend vehicle, acts as a responding vehicle and acquires the payment request information;
- a payment implementation step, in which the responding vehicle generates payment information based on the payment request information and sends the payment information to the base station, the base station sends the payment information to a payment platform, and the payment platform returns a payment result to the responding vehicle; and
- a D2D communication step, in which the base station allocates a D2D communication channel to the requesting vehicle and the responding vehicle, and the responding vehicle and the requesting vehicle communicate with each other via the D2D communication channel.

Preferably, communicating, by the responding vehicle and the requesting vehicle, with each other via the D2D communication channel comprises: notifying, by the responding vehicle, the requesting vehicle of the payment result; and communicating repayment agreement information between the requesting vehicle and the responding vehicle.

Preferably, when there exist N friend vehicles, the encrypting and broadcasting step is cyclically performed, till one of the N friend vehicles successfully decrypts the broadcasted payment request information using the vehicle information of the one of the N friend vehicles.

Preferably, in the encrypting and broadcasting step, the requesting vehicle broadcasts the encrypted payment request information using the D2D communication frequency band allocated in the resource allocating step, wherein the payment request information is encrypted using a VIN of the friend vehicle; and in the decrypting and receiving step, the at least one vehicle attempts to decrypt the broadcasted payment request information using respective VIN, and if the one of the at least one vehicle decrypts the broadcasted payment request information successfully, the one of the at least one vehicle, that is the friend vehicle, acts as a responding vehicle and acquires the payment request information.

An inter-vehicle wireless payment system based on a 5G communication network according to the disclosure includes a first on-board terminal provided on a requesting vehicle, a second on-board terminal provided on a responding vehicle, a base station and a payment platform, wherein:
- the first on-board terminal is configured to: perform 5G communication with the base station; generate a payment request and send the payment request to the base station; and perform D2D communication with the second on-board terminal;
- the base station is configured to: retrieve driver information of the requesting vehicle and a vehicle information of a friend vehicle of the requesting vehicle based on a vehicle information of the requesting vehicle contained in the payment request, the friend vehicle being the responding vehicle; encrypt payment request information using the vehicle information of the friend vehicle and broadcast the encrypted payment request information; send payment information to the payment platform upon receiving the payment information from the second on-board terminal; and allocate a D2D communication channel to the requesting vehicle and the responding vehicle;
- the second on-board terminal is configured to: perform 5G communication with the base station; acquire the payment request information by decrypting the broadcasted payment request information using a VIN of the responding vehicle; generate the payment information based on the payment request information and send the payment information to the base station; and perform D2D communication with the first on-board terminal;

the payment platform is configured to accomplish payment based on the payment information and return a payment result to the second on-board terminal.

Preferably, the base station is further configured to: retrieve the driver information of the requesting vehicle and the VIN of the friend vehicle according to a VIN of the requesting vehicle contained in the payment request by means of mobile edge computing; and encrypt the payment request information using the VIN of the friend vehicle and broadcast the encrypted payment request information.

Preferably, the base station is further configured to: detect that the requesting vehicle and the responding vehicle are in the same cell or in adjacent cells; determine whether a D2D connection between the requesting vehicle and the responding vehicle is possible according to a strategy with a maximum number of allowed D2D connections; if it is determined that the D2D connection is possible, allocate resources for the D2D connection and establish a link for the D2D connection; and otherwise, enter a waiting state. Accordingly, the base station allocates the D2D communication channel to the requesting vehicle and the responding vehicle to enable the responding vehicle and the requesting vehicle to communicate via the D2D communication channel.

Preferably, the first on-board terminal includes: a first GPS module configured to acquire clock information to keep in synchronization with the base station, and to establish an uplink and a downlink; a first 5G communication module configured to implement 5G communication with the base station and implement D2D communication with the second on-board terminal; and a first payment module configured to generate the payment request;
the second on-board terminal includes: a decryption module configured to decrypt the encrypted payment request information broadcasted by the base station using the vehicle information of the responding vehicle; a second payment module configured to generate the payment information based on the decrypted payment request information; a second GPS module configured to acquire clock information to keep in synchronization with the base station, and to establish an uplink and a downlink; and a second 5G communication module configured to implement 5G communication with the base station and implement D2D communication with the first on-board terminal.

Preferably, the base station includes: a communication module configured to communicate with the first on-board terminal and the second on-board terminal respectively; a core network configured to have vehicle-related information stored therein; a mobile edge computing module configured to retrieve the driver information of the requesting vehicle and the vehicle information of the friend vehicle from the vehicle-related information stored in the core network based on the vehicle information of the requesting vehicle contained in the payment request, and encrypt the payment request information; a broadcasting module configured to broadcast the encrypted payment request information; a payment module configured to send the payment information to the payment platform upon receiving the payment information from the second on-board terminal; and a D2D establishing module configured to allocate the D2D communication channel to the requesting vehicle and the responding vehicle.

An on-board terminal according to the disclosure includes: a GPS module configured to acquire clock information to keep in synchronization with a base station, and to establish an uplink and a downlink; a 5G communication module configured to implement 5G communication with the base station and implement D2D communication with another on-board terminal; and a payment module configured to generate a payment information according to a payment request information.

Preferably, the on-board terminal further includes: a decryption module configured to decrypt encrypted payment request information broadcasted by the base station using vehicle information of a vehicle provided with the on-board terminal.

An inter-vehicle wireless payment system based on a 5G communication network according to the disclosure includes: a first on-board terminal provided on a requesting vehicle, a second on-board terminal provided on a responding vehicle, a base station and a payment platform, wherein:
the first on-board terminal is configured to: perform 5G communication with the base station; apply a D2D communication frequency band from the base station; broadcast encrypted payment request information using the D2D communication frequency band allocated by the base station, wherein the payment request information is encrypted using vehicle information of a friend vehicle that is the responding vehicle; and perform D2D communication with the second on-board terminal;
the base station is configured to: perform resource allocation according to a strategy with a maximum number of allowed D2D connections; send a received payment information to the payment platform; and allocate a D2D communication channel to the requesting vehicle and the responding vehicle;
the second on-board terminal is configured to: perform 5G communication with the base station; perform D2D communication with the first on-board terminal; acquire the payment request information by decrypting the broadcasted payment request information using the vehicle information of the responding vehicle; and generate the payment information based on the payment request information and send the payment information to the base station; and
the payment platform is configured to accomplish payment based on the payment information and return a payment result to the second on-board terminal.

Preferably, the first on-board terminal according to the disclosure includes: a first GPS module configured to acquire clock information to keep in synchronization with the base station, and establish an uplink and a downlink; a first 5G communication module configured to implement 5G communication with the base station and implement D2D communication with the second on-board terminal; and a broadcasting module configured to broadcast the encrypted payment request information using the D2D communication frequency band allocated by the base station, wherein the payment request information is encrypted using the vehicle information of the friend vehicle; and a first payment module configured to generate the payment request information;
the second on-board terminal includes: a decryption module configured to decrypt the encrypted payment request information broadcasted by the first on-board terminal using the vehicle information of the responding vehicle; a second payment module configured to generate the payment information based on the decrypted payment request information; a second GPS module configured to acquire clock information to keep in synchronization with the base station, and establish an uplink and a downlink; and a second 5G communication module configured to implement 5G communication with the base station and implement D2D communication with the first on-board terminal.

An on-board terminal according to the disclosure includes: a GPS module configured to acquire clock information to keep in synchronization with a base station, and establish an uplink and a downlink; a 5G communication module configured to implement 5G communication with the base station and implement D2D communication with another on-board terminal, and apply a D2D communication frequency band from the base station; and a broadcasting module configured to broadcast encrypted payment request information using the D2D communication frequency band allocated by the base station, wherein the payment request information is encrypted using vehicle information of a friend vehicle that is the another on-board terminal.

A computer-readable media according to the disclosure, which has a computer program stored therein, characterized in that, when executed by a processor, the computer program causes the above inter-vehicle wireless payment method based on a 5G communication network to be implemented.

A computer device according to the disclosure includes a storage, a processor and a computer program that is stored in the storage and is executable by the processor, characterized in that, when executing the computer program, the processor is caused to implement the above inter-vehicle wireless payment method based on a 5G communication network.

In the above inter-vehicle wireless payment method based on a 5G communication network and the above inter-vehicle wireless payment system based on a 5G communication network according to the disclosure, vehicle-to-vehicle communication is realized using the D2D communication technology of the 5G technology, thus great improvement can be achieved in transmission rate and transmission delay; moreover, since 5G network has a feature of large capacity, better performance can be achieved in the case of a large number of vehicles or even in the case of traffic congestion. In addition, in the disclosure, an information encryption mechanism (for example, encryption using VIN) is added, thus ensuring that only the target vehicle can acquire the accurate information, thereby guaranteeing user account security and payment information security.

DETAILED DESCRIPTION

Some of the embodiments of the disclosure will be introduced below for providing a basic understanding of the disclosure, rather than confirming a key or crucial element of the disclosure or limiting the protection scope of the disclosure.

First, several concepts to be mentioned in the disclosure will be illustrated.

1) 5G (the Fifth Generation Mobile Communication Standard): it is also referred to as the fifth generation mobile communication technology, 5G for short, which is an extension of 4G, and the theoretical downlink speed of a 5G network is 10 Gb/s (corresponding to a download speed of 1.25 GB/s).

2) MEC (Mobile Edge Computing): mobile edge computing provides an IT service environment and a cloud computing ability in an RAN (Radio Access Network) nearest to a user mobile terminal, for further reducing delay/time delay, improving network operation efficiency, improving business distribution/delivery capacity and optimizing/improving end user experience. Thus, the "Edge" here refers to the mobile communication base station per se (eNodeB and RNC, etc.) and various servers in a wireless network (for example, sink node deployed therein). A mobile edge computing server deployed at the edge of a radio access network opens real-time wireless and network information (for example, real-time specific position of a user in a mobile state, and real-time load condition of a base station, etc.) to various upper applications and services, so as to provide various situation-related services.

3) D2D (Device-to-Device): it refers to Device-to-Device, D2D for short. Device-to-Device communication is a novel technology that allows terminals to communicate directly by multiplexing cell resources under the control of a system, thereby solving the problem of lack of spectrum resources of a wireless communication system to a certain extent. D2D technology may be applied to a mobile cellular network to improve resource utilization and network capacity. The resource occupied by each D2D communication link is equal to that occupied by a cellular communication link. D2D communication may obtain the frequency resource and transmission power required for communication, under the control of a macro cellular base station.

First of all, an inter-vehicle wireless payment method based on a 5G communication network according to the first embodiment of the disclosure will be illustrated.

Figure 1:
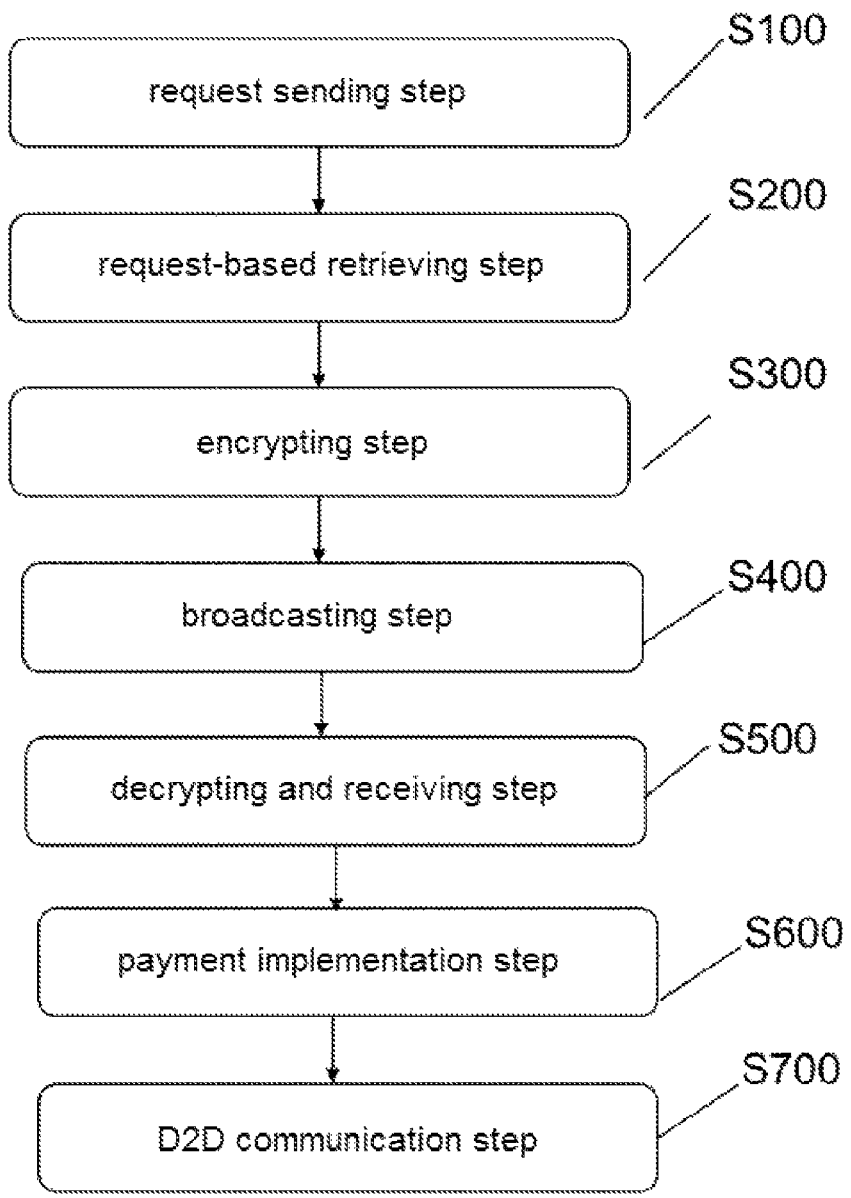
FIG. 1 is a flowchart showing an inter-vehicle wireless payment method based on a 5G communication network according to the first embodiment of the disclosure.

FIG. 1 is a flowchart showing an inter-vehicle wireless payment method based on a 5G communication network according to the first embodiment of the disclosure.

As shown in FIG. 1, the inter-vehicle wireless payment method based on a 5G communication network according to the first embodiment of the disclosure includes:

a request sending step S100, in which a requesting vehicle sends a payment request to a base station;

a request-based retrieving step S200, in which the base station retrieves a vehicle information of a friend vehicle of the requesting vehicle based on the payment request;

an encrypting step S300, in which the base station encrypts a payment request information using the vehicle information of the friend vehicle;

a broadcasting step S400, in which the base station broadcasts the encrypted payment request information;

a decrypting and receiving step S500, in which at least one vehicle within a broadcast coverage of the base station attempts to decrypt the broadcasted payment request information using its respective vehicle information, and if one of the at least one vehicle decrypts the broadcasted payment request information successfully, the one of the at least one vehicle, that is the friend vehicle, acts as a responding vehicle and acquires the payment request information;

a payment implementation step S600, in which the responding vehicle generates a payment information based on the payment request information and sends the payment information to the base station, the base station sends the payment information to a payment platform, and the payment platform returns a payment result to the responding vehicle; and a D2D communication step S700, in which the base station allocates a D2D communication channel to the requesting vehicle and the responding vehicle, and the responding vehicle and the requesting vehicle communicate with each other via the D2D communication channel.

In a certain embodiment, VIN is employed as the vehicle information.

Next, an inter-vehicle wireless payment system based on a 5G communication network according to the first embodiment of the disclosure will be illustrated.

Figure 2:
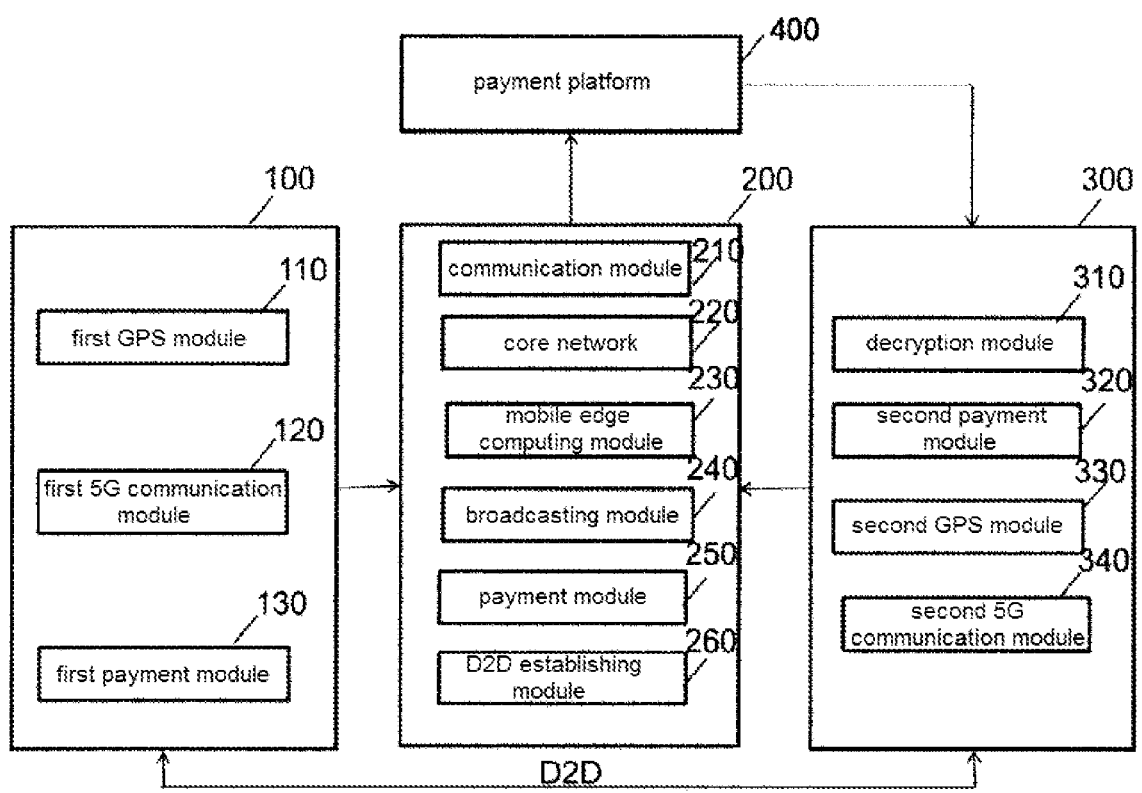
FIG. 2 is a block diagram showing a structure of an inter-vehicle wireless payment system based on a 5G communication network according to the first embodiment of the disclosure.

FIG. 2 is a block diagram showing a structure of an inter-vehicle wireless payment system based on a 5G communication network according to the first embodiment of the disclosure.

As shown in FIG. 2, the inter-vehicle wireless payment system based on a 5G communication network according to the first embodiment of the disclosure includes a first on-board terminal 100 provided on a requesting vehicle, a base station 200, a second on-board terminal 300 provided on a responding vehicle and a payment platform 400.

The first on-board terminal 100 is configured to: perform 5G communication with the base station 200; generate a payment request and send it to the base station 200; and perform D2D communication with the second on-board terminal 300.

The base station 200 is configured to: retrieve driver information of the requesting vehicle and a vehicle information of a friend vehicle of the requesting vehicle based on the vehicle information of the requesting vehicle contained in the payment request; encrypt a payment request information using the vehicle information of the friend vehicle and broadcast the encrypted payment request information; and send a payment information to the payment platform upon receiving the payment information from the second on-board terminal 300; additionally, the base station 300 is configured to allocate a D2D communication channel to the requesting vehicle 200 and the second on-board terminal 300 as the responding vehicle.

The second on-board terminal 300 is configured to: perform 5G communication with the base station 200; decrypt the broadcasted payment request information using the vehicle information of the responding vehicle to acquire the above payment request information; generate the payment information based on the payment request information and send the payment information to the base station 200; and perform D2D communication with the first on-board terminal 100.

The payment platform 400 is configured to accomplish payment based on the payment information and return a payment result to the second on-board terminal 300 as the responding vehicle.

In a certain embodiment, the first on-board terminal 100 includes: a first GPS module 110 configured to acquire clock information to keep in synchronization with the base station 200, and establish an uplink and a downlink; a first 5G communication module 120 configured to implement 5G communication with the base station 200 and implement D2D communication with the second on-board terminal; and a first payment module 130 configured to generate the payment request. In a certain embodiment, the second on-board terminal 300 includes: a decryption module 310 configured to decrypt the encrypted payment request information broadcasted by the base station 200 using the vehicle information of the responding vehicle; a second payment module 320 configured to generate the payment information based on the decrypted payment request information; a second GPS module 330 configured to acquire clock information to keep in synchronization with the base station 200, and establish an uplink and a downlink; and a second 5G communication module 340 configured to implement 5G communication with the base station 200 and implement D2D communication with the first on-board terminal.

Theoretically, the first on-board terminal 100 and the second on-board terminal 300 may be configured with the same function, while the above description only refines their respective detailed functions.

In a certain embodiment, the base station 200 includes: a communication module 210 configured to communicate with the first on-board terminal 100 and the second on-board terminal 300 respectively; a core network 220 configured to store vehicle-related information, for example, the driver information and the VIN of the vehicle, and friend information of the vehicle driver, etc.; a mobile edge computing module 230 configured to retrieve the driver information of the requesting vehicle and the vehicle information of the friend vehicle thereof from the vehicle-related information stored in the core network 220 based on the vehicle information of the requesting vehicle contained in the payment request, and encrypt the payment request information using the vehicle information of the friend vehicle; a broadcasting module 240 configured to broadcast the encrypted payment request information; a payment module 250 configured to send the payment information to the payment platform 400 upon receiving the payment information from the second on-board terminal 300; and a D2D establishing module 260 configured to allocate the D2D communication channel to the requesting vehicle and the responding vehicle.

Next, one example of the inter-vehicle wireless payment method based on a 5G communication network according to the first embodiment of the disclosure will be illustrated.

This example shows an on-board payment method by which wireless payment is directly implemented between vehicles based on the D2D technology in a 5G communication system. This method is applicable to a scenario in which a vehicle finds that, when performing on-board payment, the account balance is not enough to pay the current fee (e.g., toll) and needs to loan money from other vehicles. In this case, for making a compromise between the practicability and allsidedness of the method, the banks of the vehicle user and the lender are allowed to be different, thus a third-party platform (which is referred to as payment platform here) is introduced in the method for accomplishing interbank transaction.

Furthermore, for easy description, each vehicle is in a normal-speed driving state or in a stationary state, that is, the driving speed is lower than 60 km/h, thereby ensuring that the D2D communication is able to be established between vehicles. The D2D communication is under the control of the base station, and both of the vehicles of the two parties meet the requirements of D2D communication, that is, the path loss from the sending end to the receiving end is less than a certain threshold TH1 (of which the value is associated with the geographic environment of the vehicle), and the received signal strength of the receiving end is larger than a certain threshold TH2 (of which the value is associated with the geographic environment of the vehicle). The on-board terminal of the vehicle updates the GPS data at a fixed frequency (for example, 1 Hz, which is concerned with the GPS type). At the same time, the payment bank card bond to the current vehicle (i.e., the "requesting vehicle") and the payment bank card bond to the friend vehicle are from different banks, and a payment platform is employed for realizing interbank transaction.

The inter-vehicle wireless payment method based on a 5G communication network according to this embodiment includes the following steps:

1) the current vehicle starts, and the first on-board terminal 100 works, wherein the first on-board terminal includes a first GPS module 110, a first communication module 120 and a first payment module 130. By the first GPS module 110, the current vehicle may acquire the clock information to keep in synchronization with the base station 200 and establish an uplink communication link and a downlink communication link. The current vehicle may further obtain its own motion state information and position information via the first GPS module 110, wherein the motion state information and the position information respectively refer to the speed and acceleration of the current vehicle and the latitude and longitude of the vehicle, and such information may help the on-board terminal more accurately screen the payment scenario-related information.

2) The first on-board terminal 100 of the current vehicle sends the vehicle identification number (VIN) to the base station 200 via the uplink, and the base station 200 loads the basic information of the current vehicle into a mobile edge computing (MEC) module 230 of the base station 200 by accessing the core network 220, wherein the information includes related information such as friend information of the current vehicle and credit rating of the current vehicle;

3) When the first on-board terminal 100 detects that the current vehicle is in an idling state, the vehicle enters step 4); otherwise, it continues to perform the detection step.

4) The payment module 130 of the first on-board terminal 100 generalizes the payment request message received previously, pushes it to an on-board display screen, to prompt the user to pay. If the user account balance is enough for the current payment, it performs payment and returns step 3); otherwise, it performs step 5);

5) The current vehicle sends information such as the VIN and the required amount to the base station 200. Since the payment request message received by the current vehicle is a generalized message, there may exist a plurality of payees, thus in order to lower data transmission volume and ensure information security of the current vehicle, real-time transaction between the current vehicle and the friend vehicle is employed in this method, and the payment to the payee is accomplished by the current vehicle.

6) The base station 200 transfers such information to the mobile edge computing module 230, and the mobile edge computing module 230 extracts the friend information according to the VIN, then accomplishes the search of the friend vehicle of the current vehicle according to the VIN, and then performs information encryption using the VIN of the friend vehicle, wherein the information to be encrypted is the VIN of the current vehicle, the driver information of the current vehicle and the required amount of the current vehicle;

7) The broadcasting module 240 broadcasts the information encrypted by the mobile edge computing module 230, and the second on-board terminal 300 provided on the vehicle (i.e., the responding vehicle) receiving the broadcasted information attempts to decrypt using its own VIN, and if the information cannot be decrypted successful, it will be discarded. If the information can be decrypted successfully, the second on-board terminal 300 displays the loan information on an on-board display screen, wherein the loan information includes, for example, the driver information of the current vehicle and the required amount of the current vehicle.

8) If the user decides to lend to the current vehicle, the second payment module 320 of the second on-board terminal 300 of the responding vehicle performs payment, specifically, it pays the requested amount to the current vehicle. The second 5G communication module 340 of the responding vehicle sends grant information to the base station 200 via the uplink, wherein the grant information includes a grant flag, VIN of the responding vehicle, VIN of the current vehicle and payment amount, etc. If the base station does not receive the grant information within a set time, it enters step 12).

9) After the base station 200 receives and parses the grant information, it performs two operation: starting to establish a D2D connection between the current vehicle and the responding vehicle, that is, entering step 10); finding the account information used by the current vehicle and the account information used by the responding vehicle via the mobile edge computing module 230 using the VIN of the current vehicle and the VIN of the responding vehicle, packaging the two pieces of account information and the payment amount information and uploading it to the payment platform 400, and accomplishing inter-bank transfer with the aid of the payment platform 400, that is, entering step 11).

10) The D2D establishing module 260 of the base station 200 detects that the source vehicle and the destination vehicle are in the same cell or in adjacent cells, and determines according to a strategy with a maximum number of allowed D2D connections whether a D2D connection therebetween can be established. If it is determined that the D2D connection can be established, the base station 200 allocates resources to the D2D connection and establishes a link for the D2D connection; otherwise, it enters a waiting state.

11) The payment platform 400 parses the information received and informs the payer bank, i.e., the bank of the account used by the responding vehicle, to subtract the corresponding amount from the corresponding account. At the same time, it informs the payee bank, i.e., the bank of the account used by the current vehicle, to add the corresponding amount to the corresponding account. After the payment platform 400 receives a success feedback from the payer bank and a success feedback from the payee bank, it sends success information of the current payment to the second on-board terminal 300 of the responding vehicle via the base station 200.

12) A D2D link is established between the requesting vehicle and the responding vehicle thereof, and after the responding vehicle receives the payment success information forwarded by the base station 200, the responding vehicle (i.e., the second on-board terminal 300) sends the account identification number of its own vehicle to the current vehicle (i.e., the first on-board terminal 100), and the first on-board terminal 100 stores this information into non-accomplished payment, which will be uniformly pushed in the next payment information. The current vehicle sends the repayment proposal information as set by the user to the responding vehicle, wherein the information includes related information such as specific repayment time and repayment mode, etc. If the responding vehicle receives and accepts the proposal, it sends accept information to the current vehicle, which indicates that an agreement is reached.

13) After the transaction and the agreement are accomplished, the first on-board terminal 100 and the second on-board terminal 300 notify the base station 200 via the uplink that the D2D link is disconnected and resources are released.

14) The base station 200 notifies the current vehicle via the downlink that no friend vehicle responds to the request. If the current vehicle selects to initiate a request to a strange vehicle (that is, not a friend vehicle), the base station performs information broadcasting, wherein the information includes request VIN, account identification number used by the vehicle and requested amount, then it enters step 8). If the current vehicle selects to give up, it enters step 3) and waits for the next payment request message push.

In the case of selecting to loan from a strange vehicle, for example, the method further includes the following features: the information encryption key is a uniformly set key, for example, initially set as: 'rent', which is the information shared by all vehicles, and all vehicles may decrypt the information encrypted with 'rent' as a key; it may be preset for a vehicle whether to lend money to a strange vehicle, if it is set to 'no', the vehicle does not use 'rent' to decrypt the information, and the loan information from a strange vehicle may be regarded as irrelevant information and be discarded; if it is set to 'yes', the vehicle may decrypt the loan information from a strange vehicle, and the push flow is consistent with that in which it loans money from a friend vehicle; for repayment, in this system, the payment platform 400 is set as being able to issue an electronic loan statement for being used for related affairs.

Next, an inter-vehicle wireless payment method based on a 5G communication network according to the second embodiment of the disclosure will be illustrated. In the second embodiment, instead of broadcasting and searching for a target vehicle (a responding vehicle) by a base station in a cell, the vehicle itself broadcasts and searches for a target vehicle.

Figure 3:
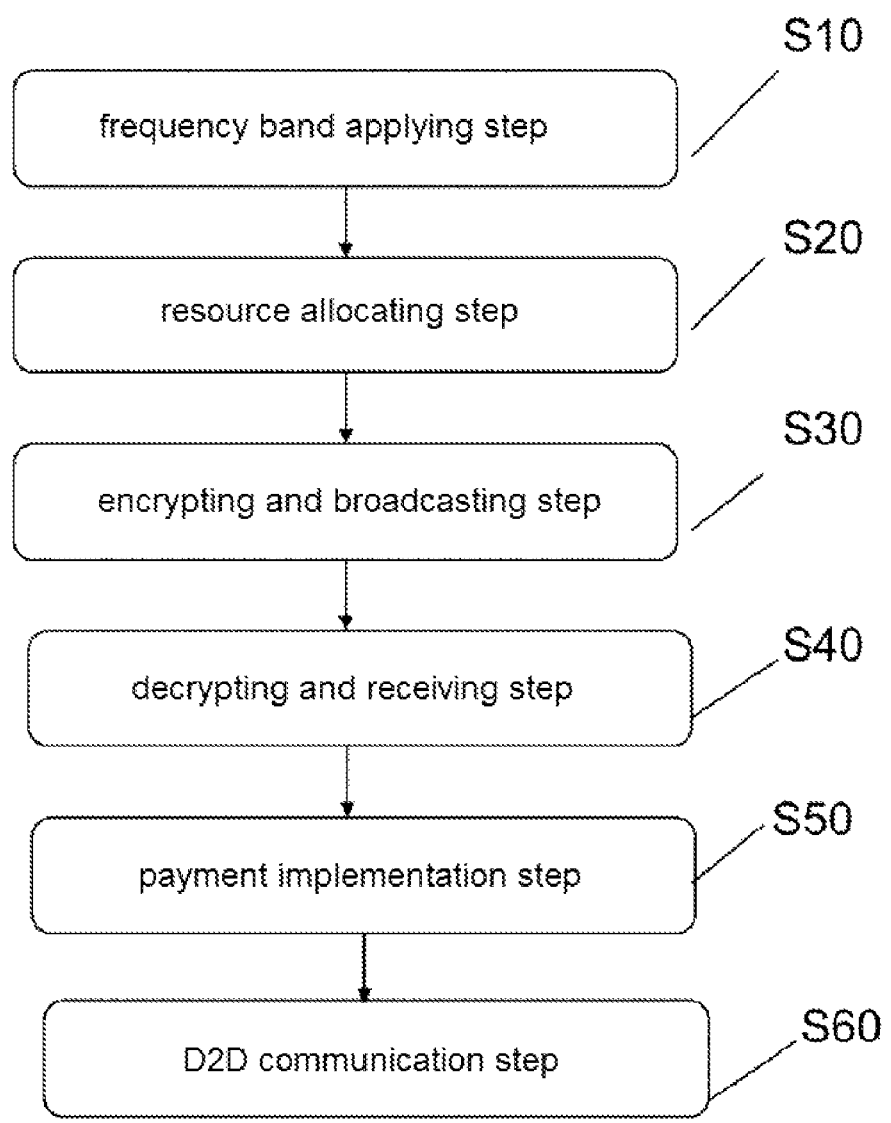
FIG. 3 is a flowchart showing an inter-vehicle wireless payment method based on a 5G communication network according to the second embodiment of the disclosure.

FIG. 3 is a flowchart showing an inter-vehicle wireless payment method based on a 5G communication network according to the second embodiment of the disclosure.

As shown in FIG. 3, the inter-vehicle wireless payment method based on a 5G communication network according to the second embodiment of the disclosure includes:

a frequency band applying step S10, in which a requesting vehicle applies a D2D communication frequency band from the base station;

a resource allocating step S20, in which the base station performs resource allocation according to a strategy with a maximum number of allowed D2D connections;

an encrypting and broadcasting step S30, in which the requesting vehicle broadcasts an encrypted payment request information using the D2D communication frequency band allocated in the resource allocating step, wherein the payment request information is encrypted using vehicle information of a friend vehicle;

a decrypting and receiving step S40, in which at least one vehicle attempts to decrypt the broadcasted payment request information using the respective vehicle information, and if one of the at least one vehicle decrypts the broadcasted payment request information successfully, the one of the at least one vehicle, that is the friend vehicle, acts as a responding vehicle and acquires the payment request information;

a payment implementation step S50, in which the responding vehicle generates a payment information based on the payment request information and sends the payment information to the base station, the base station sends the payment information to a payment platform, and the payment platform returns a payment result to the responding vehicle; and a D2D communication step S60, in which the base station allocates a D2D communication channel to the requesting vehicle and the responding vehicle, and the responding vehicle and the requesting vehicle communicate with each other via the D2D communication channel.

When there exist N friend vehicles, the encrypting and broadcasting step S30 may be cyclically performed, till a certain friend vehicle successfully decrypts the broadcasted payment request information using the vehicle information of its own.

The VIN of the friend vehicle may be employed as the vehicle information of the friend vehicle for encrypting the payment request information.

Figure 4:
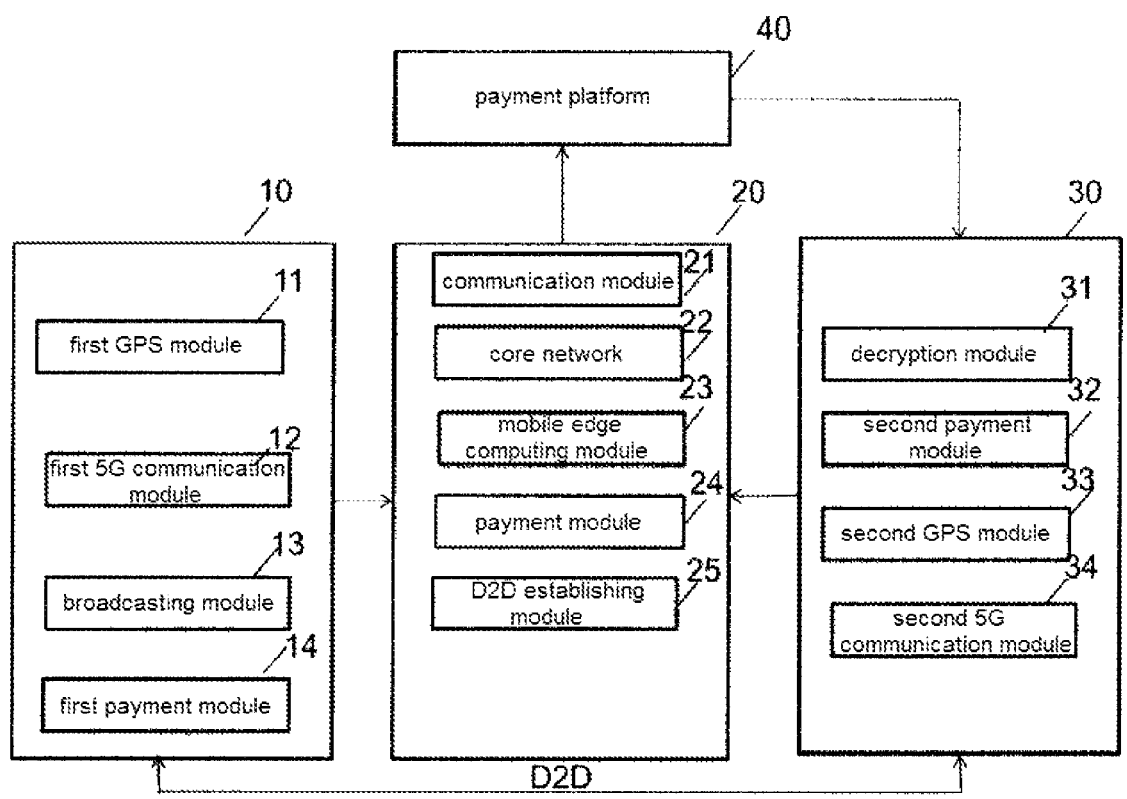
FIG. 4 is a block diagram showing a structure of an inter-vehicle wireless payment system based on a 5G communication network according to the second embodiment of the disclosure.

FIG. 4 is a block diagram showing a structure of an inter-vehicle wireless payment system based on a 5G communication network according to the second embodiment of the disclosure.

As shown in FIG. 4, the inter-vehicle wireless payment system based on a 5G communication network according to the second embodiment of the disclosure includes: a first on-board terminal 10 provided on a requesting vehicle, a base station 20, a second on-board terminal 30 provided on a responding vehicle and a payment platform 40.

The first on-board terminal 10 is configured to: perform 5G communication with the base station 20; apply a D2D communication frequency band from the base station 20; and broadcast encrypted payment request information using the D2D communication frequency band allocated by the base station 20, wherein the payment request information is encrypted using vehicle information (for example, vehicle VIN) of a friend vehicle. Further, the first on-board terminal is configured to perform D2D communication with the second on-board terminal.

The base station 20 is configured to: perform resource allocation according to a strategy with a maximum number of allowed D2D connections; send received payment information to the payment platform 40, and allocate a D2D communication channel to the requesting vehicle and the responding vehicle.

The second on-board terminal 30 is configured to: perform 5G communication with the base station 20; perform D2D communication with the first on-board terminal 10; attempt to decrypt the broadcasted payment request information using the vehicle information of the responding vehicle; if decrypting successfully (that is, the responding vehicle is the friend vehicle), acquire the payment request information, generate the payment information based on the payment request information, and send it to the base station 20.

The payment platform 40 is configured to accomplish payment based on the payment information and return a payment result to the second on-board terminal 30.

In a certain embodiment, the first on-board terminal 10 includes: a first GPS module 11 configured to acquire clock information to keep in synchronization with the base station, and establish an uplink and a downlink; a first 5G communication module 12 configured to implement 5G communication with the base station and implement D2D communication with the second on-board terminal; a broadcasting module 13 configured to broadcast the encrypted payment request information using the D2D communication frequency band allocated by the base station, wherein the payment request information is encrypted using the vehicle information of the friend vehicle; and a first payment module 14 configured to generate the payment request information.

In a particular embodiment, the broadcasting module 13 can employ an antenna enabling broadcasting, for D2D communication.

The base station 20 may include: a communication module 21 configured to communicate with the first on-board terminal 100 and the second on-board terminal 300 respectively; a core network 22 configured to store vehicle-related information, for example, driver information and VIN of the vehicle, friend information of the vehicle driver, etc.; a mobile edge computing module 23 configured to retrieve the driver information of the requesting vehicle and the vehicle information of the friend vehicle thereof based on the stored vehicle-related information; a payment module 24 configured to send the payment information to the payment platform 400 upon receiving the payment information from the second on-board terminal 300; and a D2D establishing module 25 configured to perform resource allocation and allocate the D2D communication channel to the requesting vehicle and the responding vehicle according to a strategy with a maximum number of allowed D2D connections.

The second on-board terminal 30 may include: a decryption module 31 configured to decrypt the encrypted payment request information broadcasted by the first on-board terminal using the vehicle information of the responding vehicle; a second payment module 32 configured to generate the payment information based on the decrypted payment request information; a second GPS module 33 configured to acquire clock information to keep in synchronization with the base station, and establish an uplink and a downlink; and a second 5G communication module 34 configured to implement 5G communication with the base station and implement D2D communication with the first on-board terminal.

Next, one example of the inter-vehicle wireless payment method based on a 5G communication network according to the second embodiment of the disclosure will be illustrated.

The inter-vehicle wireless payment method based on a 5G communication network according to this embodiment includes the following steps:

1) the current vehicle starts, the first on-board terminal 10 works, wherein the first on-board terminal includes a first GPS module 11, a first 5G communication module 12, a broadcasting module 13 and a first payment module 14. The current vehicle may acquire the clock information via the first GPS module 11 to keep in synchronization with the base station 20, and establish an uplink communication link and a downlink communication link. The current vehicle may further obtain its own motion state information and position information via the first GPS module 11, wherein the motion state information and the position information respectively refer to the speed and acceleration of the current vehicle and the latitude and longitude of the vehicle, and such information may help the on-board terminal more accurately screen the payment scenario-related information.

2) The first on-board terminal 10 of the current vehicle sends the vehicle identification number (VIN) to the base station 20 via the uplink, the base station 20 loads the basic information of the current vehicle stored in the core network 22 into the mobile edge computing (MEC) module 23 of the base station 20 by accessing the core network 22, wherein the information includes related information such as friend information of the current vehicle and credit rating of the current vehicle.

3) When the first on-board terminal 10 detects that the current vehicle is in an idling state, the vehicle enters step 4); otherwise, it continues to perform the detection step.

4) The payment module 13 of the first on-board terminal 10 generalizes the payment request message received previously, pushes it to an on-board display screen, and prompts the user to pay. If the user account balance is enough for the current payment, it performs payment and returns step 3); otherwise, it performs step 5).

5) The first on-board terminal 10 of the current vehicle applies a D2D communication frequency band from the base station 20 via the uplink, and the base station 20 performs frequency band resource allocation according to a strategy with a maximum number of allowed D2D connections.

6) The current vehicle performs information broadcast via the D2D communication frequency band allocated by the base station 20, wherein the information includes the VIN of the current vehicle, loan amount and owner information of the current vehicle, which is encrypted using the VIN of a friend vehicle of the current vehicle as a key. Since the number of friend vehicles may be larger than 1, the broadcasting of the payment request information may employ a cyclical mechanism, and the key is selected cyclically from friend 1 to friend n.

7) When a vehicle receives the broadcasted payment request information of the current vehicle, if it cannot decrypt the broadcasted payment request information using its own VIN, it performs message forwarding at a certain frequency, for example, one out of ten, and the rest messages will be discarded. If a vehicle can decrypt the broadcasted payment request information, the vehicle is the target vehicle (i.e., the friend vehicle), and the target vehicle pushes the decrypted information to a display screen.

8) If a user decides to lend to the current vehicle, the target vehicle becomes the responding vehicle, and the second on-board terminal 20 performs payment, specifically, it pays the requested amount to the current vehicle. The target vehicle sends the payment information to the base station 20 via the uplink, wherein the information includes target vehicle VIN, current vehicle VIN and payment amount. At the same time, it establishes a D2D communication with the current vehicle and sends the payment information to the current vehicle.

9) The subsequent flow is the same as the step 11) in the first embodiment.

In the above inter-vehicle wireless payment method based on a 5G communication network and the above inter-vehicle wireless payment system based on a 5G communication network according to the disclosure, vehicle-to-vehicle communication is realized using the D2D communication technology of the 5G technology, thus great improvement can be achieved in transmission rate and transmission delay; moreover, since 5G network has a feature of large capacity, better performance can be achieved in the case of a large number of vehicles or even in the case of congestion. In addition, driving habits of a driver may be comprehensively analyzed according to the vehicle data by means of Big Data technology, and related payment information may be pushed targetedly. Especially, in the disclosure, an information encryption mechanism (for example, encrypting using VIN) is added, thus ensuring that only the target vehicle can acquire the accurate information, thereby guaranteeing user account security and payment information security.

Moreover, the disclosure further provides a computer-readable media, which has a computer program stored therein, wherein, when executed by a processor, the computer program causes the above inter-vehicle wireless payment method based on a 5G communication network to be implemented.

Moreover, the disclosure further provides a computer device, including a storage, a processor and a computer program that is stored in the storage and is executable by the processor, wherein, when executing the computer program, the processor is caused to implement the above inter-vehicle wireless payment method based on a 5G communication network.

The above embodiments mainly illustrate an inter-vehicle wireless payment method based on a 5G communication network according to the disclosure and a system for the same. Although only some of the specific embodiments of the disclosure are described, one of ordinary skills in the art may understand that the disclosure may be implemented in various other forms without departing from the subject and scope of the disclosure. Therefore, the examples and embodiments shown are merely illustrative, rather than being limitative. Various modifications and substitutions may be made to the disclosure, without departing from the conception and scope of the disclosure as defined in the appended claims.

What is claimed is:

1. An inter-vehicle wireless payment method based on a 5G communication network, comprising:
    a request sending step, in which a requesting vehicle sends a payment request to a base station;
    a request-based retrieving step, in which the base station retrieves vehicle information of a friend vehicle of the requesting vehicle based on the payment request;
    an encrypting step, in which the base station encrypts payment request information using the vehicle information of the friend vehicle;
    a broadcasting step, in which the base station broadcasts the encrypted payment request information;
    a decrypting and receiving step, in which at least one vehicle within a broadcast coverage of the base station attempts to decrypt the broadcasted payment request information using its respective vehicle information, and if the at least one vehicle includes the friend vehicle, the friend vehicle decrypts the broadcasted payment request information successfully, and acquires the payment request information;
    a payment implementation step, in which the friend vehicle generates payment information based on the payment request information and sends the payment information to the base station, the base station sends the payment information to a payment platform, and the payment platform returns a payment result to the friend vehicle; and
    a Device-to-Device (D2D) communication step, in which the base station allocates a D2D communication channel to the requesting vehicle and the friend vehicle, and the friend vehicle and the requesting vehicle communicate with each other via the D2D communication channel.

2. The inter-vehicle wireless payment method based on a 5G communication network according to claim 1, wherein:
    in the request-based retrieving step, the base station retrieves driver information of the requesting vehicle and a vehicle identification number (VIN) of the friend vehicle according to a VIN of the requesting vehicle contained in the payment request by means of mobile edge computing; and
    in the encrypting step, the base station encrypts the payment request information using the VIN of the friend vehicle and broadcasts the encrypted payment request information.

3. The inter-vehicle wireless payment method based on a 5G communication network according to claim 1, wherein communicating, by the friend vehicle and the requesting vehicle, with each other via the D2D communication channel comprises:
    notifying, by the friend vehicle, the requesting vehicle of the payment result; and
    communicating repayment agreement information between the requesting vehicle and the friend vehicle.

4. The inter-vehicle wireless payment method based on a 5G communication network according to claim 1, wherein the D2D communication step comprises substeps of:
    detecting, by the base station, that the requesting vehicle and the friend vehicle are in a same cell or in adjacent cells, and determining whether a D2D connection between the requesting vehicle and the friend vehicle is possible according to a strategy with a maximum number of allowed D2D connections;
    if it is determined that the D2D connection is possible, allocating, by the base station, resources for the D2D connection and establishing a link for the D2D connection; otherwise, entering a waiting state; and
    allocating, by the base station, the D2D communication channel to the requesting vehicle and the friend vehicle, and communicating, by the friend vehicle and the requesting vehicle, with each other via the D2D communication channel.

5. An inter-vehicle wireless payment method based on a 5G communication network, comprising:
    a frequency band applying step, in which a requesting vehicle applies a Device-to-Device (D2D) communication frequency band from a base station; a resource allocating step, in which the base station performs resource allocation according to a strategy with a maximum number of avowed D2D connections;
    an encrypting and broadcasting step, in which the requesting vehicle broadcasts encrypted payment request information using the D2D communication frequency band allocated in the resource allocating step, and stops broadcasting when a friend vehicle responds, wherein the payment request information is encrypted using vehicle information of the friend vehicle;
    a decrypting and receiving step, in which at least one vehicle attempts to decrypt the broadcasted payment request information using its respective vehicle information, and if of the at least one vehicle includes the friend vehicle the friend vehicle decrypts the broadcasted payment request information successfully, and acquires the payment request information;
    a payment implementation step, in which the friend vehicle generates payment information based on the payment request information and sends the payment information to the base station, the base station sends the payment information to a payment platform, and the payment platform returns a payment result to the friend vehicle; and
    a D2D communication step, in which the base station allocates a D2D communication channel to the requesting vehicle and the friend vehicle, and the friend vehicle and the requesting vehicle communicate with each other via the D2D communication channel.

6. The inter-vehicle wireless payment method based on a 5G communication network according to claim 5, wherein communicating, by the friend vehicle and the requesting vehicle, with each other via the D2D communication channel comprises:
   notifying, by the friend vehicle, the requesting vehicle of the payment result; and
   communicating repayment agreement information between the requesting vehicle and the friend vehicle.

7. The inter-vehicle wireless payment method based on a 5G communication network according to claim 5, wherein:
   when there exist N friend vehicles, the encrypting and broadcasting step is cyclically performed, till one of the N friend vehicles successfully decrypts the broadcasted payment request information using the vehicle information of the one of the N friend vehicles.

8. The inter-vehicle wireless payment method based on a 5G communication network according to claim 5, wherein:
   in the encrypting and broadcasting step, the requesting vehicle broadcasts the encrypted payment request information using the D2D communication frequency band allocated in the resource allocating step, wherein the payment request information is encrypted using a vehicle identification number (VIN) of the friend vehicle;
   in the decrypting and receiving step, the at least one vehicle attempts to decrypt the broadcasted payment request information using its respective VIN, and if the at least one vehicle includes the friend vehicle, the friend vehicle decrypts the broadcasted payment request information successfully, and acquires the payment request information.

9. The inter-vehicle wireless payment method based on a 5G communication network according to claim 1, wherein the request sending step comprises:
   detecting, by the requesting vehicle, whether the requesting vehicle is in an idling state;
   determining, by the requesting vehicle, whether an account balance of the requesting vehicle is enough for a required payment, if it is detected that the requesting vehicle is in the idling state; and sending, by the requesting vehicle, the payment request to the base station.

10. The inter-vehicle wireless payment method based on a 5G communication network according to claim 2, wherein the payment request further contains a payment amount requested by the request vehicle, and the encrypted payment request information contains the VIN and the driver information of the requesting vehicle, and the requested payment amount.

11. The inter-vehicle wireless payment method based on a 5G communication network according to claim 1, wherein the payment implementation step comprises:
   generating, by the friend vehicle, a payment grant information containing a payment grant flag, vehicle information of the requesting vehicle and the friend vehicle, and a payment amount requested in the payment request, and sending the generated payment grant information to the base station, if an input, indicating that a user of the friend vehicle accepts the payment request is received from the user of the friend vehicle;
   parsing, by the base station, the payment grant information received from the friend vehicle, retrieving account information of the requesting vehicle and the friend vehicle using respective vehicle information, generating a packaged grant information containing the retrieved account information and the requested payment amount, and sending the packaged grant information to the payment platform; and
   parsing, by the payment platform, the packaged grant information received from the base station, carrying out an inter-bank transfer based on the packaged grant information, and returning the payment result to the friend vehicle via the base station.

12. The inter-vehicle wireless payment method based on a 5G communication network according to claim 3, wherein communicating repayment agreement information between the requesting vehicle and the friend vehicle comprises:
   sending, by the friend vehicle, to the requesting vehicle an account identification number of the friend vehicle;
   sending, by the requesting vehicle, to the friend vehicle a repayment proposal as set by a user of the requesting vehicle; and
   sending, by the friend vehicle, to the requesting vehicle an accept message, an Input, indicating that a user of the friend vehicle accepts the received repayment proposal is received from the user of the friend vehicle.

13. The inter-vehicle wireless payment method based on a 5G communication network according to claim 1, further comprising after the broadcasting step:
   notifying, by the base station, the requesting vehicle that there is no response from the friend vehicle to the payment request, if the base station has not received the payment information for a preset period of time;
   sending, by the requesting vehicle, to the base station a payment request specific to strange vehicles;
   broadcasting, by the base station, a payment request information encrypted with a public key set for the strange vehicles;
   decrypting, by one of the strange vehicles, the encrypted payment request information broadcasted by the base station using the public key, and sending, if an input indicating that a user of the one of the strange vehicles accepts the payment request is received from the user of the one of the strange vehicles, to the base station a payment grant information generated based on the decrypted payment request information;
   sending, by the base station, to the payment platform the payment grant information received from the one of the strange vehicles, receiving a payment result returned by the payment platform having carried out an inter-bank transfer based on the payment grant information, and sending the received payment result to the one of the strange vehicles; and
   allocating, by the base station, a D2D communication channel to the requesting vehicle and the one of the strange vehicles such that the requesting vehicle and the one of the strange vehicles communicate with each other via the D2D communication channel.

14. The inter-vehicle wireless payment method based on a 5G communication network according to claim 5, wherein the frequency band applying step comprises:
   detecting, by the requesting vehicle, whether the requesting vehicle is in an idling state;
   determining, by the requesting vehicle, whether an account balance of the requesting vehicle is enough for a required payment, if it is detected that the requesting vehicle is in the idling state; and
   applying, by the requesting vehicle, the D2D communication frequency band from the base station.

15. The inter-vehicle wireless payment method based on a 5G communication network according to claim 8, wherein the encrypted payment request information contains the VIN and the driver information of the requesting vehicle, and the requested payment amount.

16. The inter-vehicle wireless payment method based on a 5G communication network according to claim 5, wherein the payment implementation step comprises:
   generating, by the friend vehicle, a payment grant information containing a payment grant flag, vehicle information of the requesting vehicle and the friend vehicle, and a payment amount requested in the payment request, and sending the generated payment grant information to the base station, if an input, indicating that a user of the friend vehicle accepts the payment request is received from the user of the friend vehicle;
   parsing, by the base station, the payment grant information received from the friend vehicle, retrieving account information of the requesting vehicle and the friend vehicle using respective vehicle information, generating a packaged grant information containing the retrieved account information and the requested payment amount, and sending the packaged grant information to the payment platform; and
   parsing, by the payment platform, the packaged grant information received from the base station, carrying out an inter-bank transfer based on the packaged grant Information, and returning the payment result to the friend vehicle via the base station.

17. The inter-vehicle wireless payment method based on a 5G communication network according to claim 6, wherein communicating repayment agreement information between the requesting vehicle and the friend vehicle comprises:
   sending, by the friend vehicle, to the requesting vehicle an account identification number of the friend vehicle:
   sending, by the requesting vehicle, to the friend vehicle a repayment proposal as set by a user of the requesting vehicle; and
   sending, by the friend vehicle, to the requesting vehicle an accept message if an input, indicating that a user of the friend vehicle accepts the received repayment proposal is received from the user of the friend vehicle.

18. The inter-vehicle wireless payment method based on a 5G communication network according to claim 5, further comprising after the encrypting and broadcasting step:
   notifying, by the base station, the requesting vehicle that there is no response from the friend vehicle to the payment request, if the base station has not received the payment information for a preset period of time;
   broadcasting, by the requesting vehicle, a payment request information encrypted with a public key set for strange vehicles;
   decrypting, by one of the strange vehicles, the encrypted payment request information broadcasted by the requesting vehicle using the public key, and sending to the base station, in if an input indicating that a user of the one of the strange vehicles accepts the payment request is received from the user of the one of the strange vehicles, a payment grant information generated based on the decrypted payment request information;
   sending, by the base station, to the payment platform the payment grant information received from the one of the strange vehicles, receiving a payment result returned by the payment platform having carried out an inter-bank transfer based on the payment grant information, and sending the received payment result to the one of the strange vehicles; and
   allocating, by the base station, a D2D communication channel to the requesting vehicle and the one of the strange vehicles such that the requesting vehicle and the one of the strange vehicles communicate with each other via the D2D communication channel.

* * * * *